Dec. 8, 1964  A. W. ERNESTUS  3,160,036
ROLL-FORMING MILL
Filed Aug. 29, 1958  5 Sheets-Sheet 1

INVENTOR.
ADOLPH W. ERNESTUS
BY
George C. Sullivan
Agent

Dec. 8, 1964 A. W. ERNESTUS 3,160,036
ROLL-FORMING MILL
Filed Aug. 29, 1958 5 Sheets-Sheet 2

INVENTOR.
ADOLPH W. ERNESTUS
BY
George C. Sullivan
Agent

Dec. 8, 1964  A. W. ERNESTUS  3,160,036
ROLL-FORMING MILL
Filed Aug. 29, 1958  5 Sheets-Sheet 3
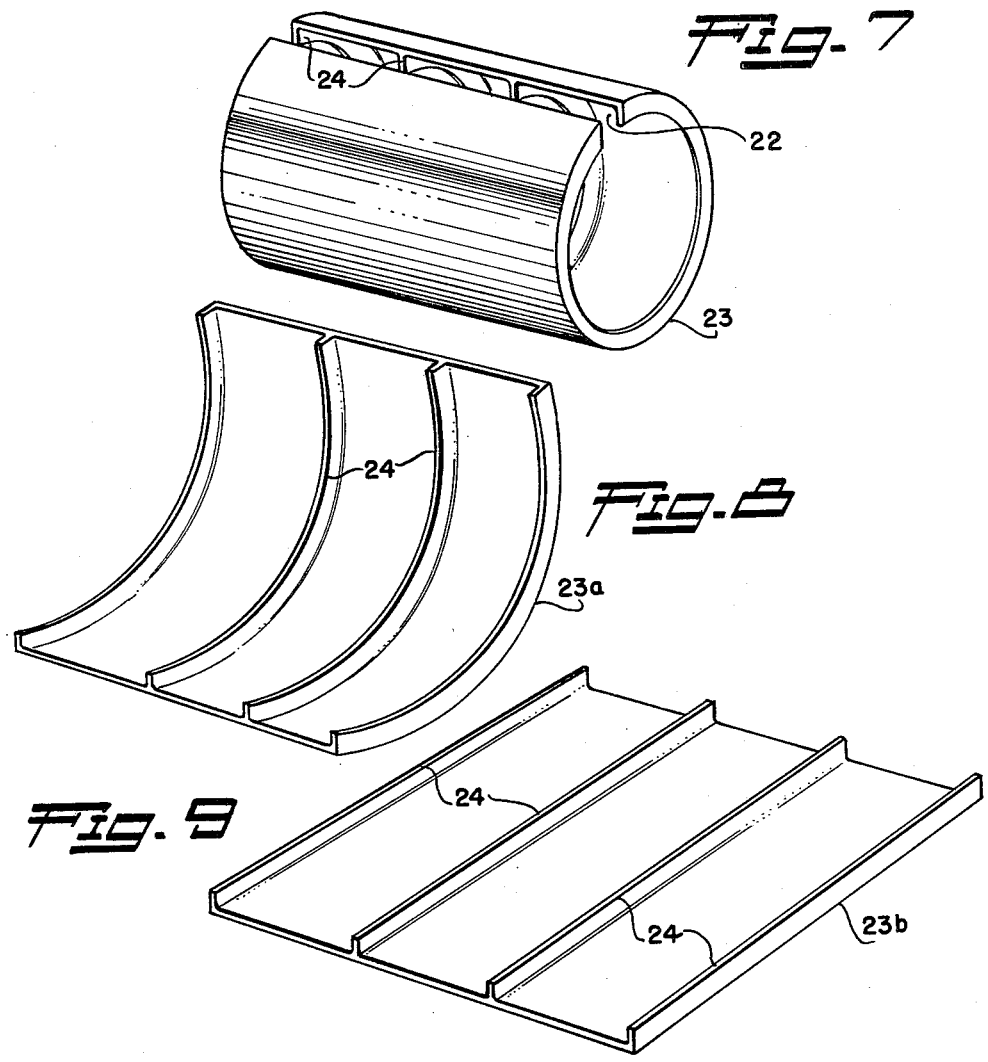
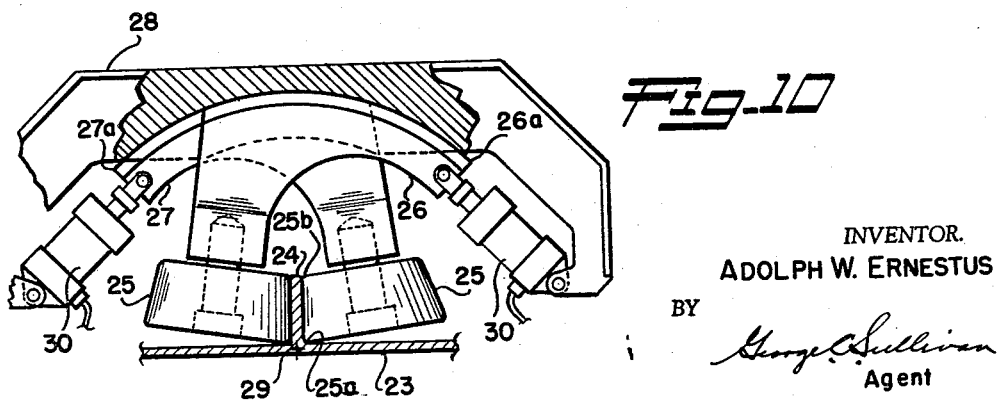
INVENTOR.
ADOLPH W. ERNESTUS
BY
George C. Sullivan
Agent Dec. 8, 1964 A. W. ERNESTUS 3,160,036
ROLL-FORMING MILL
Filed Aug. 29, 1958 5 Sheets-Sheet 4
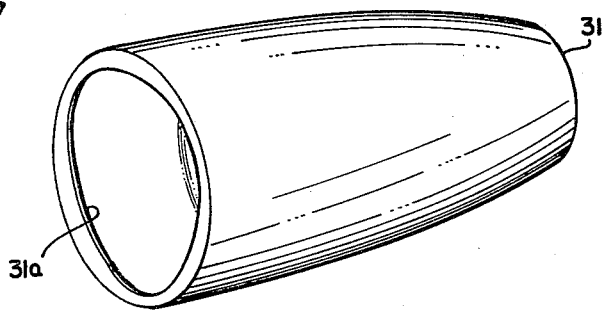
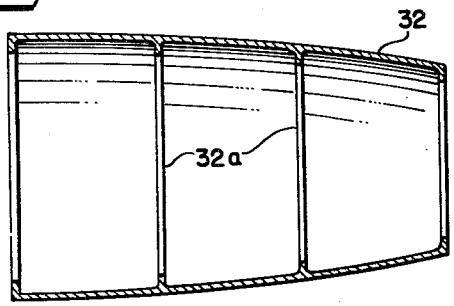
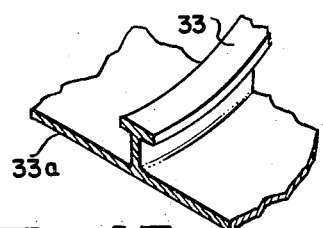
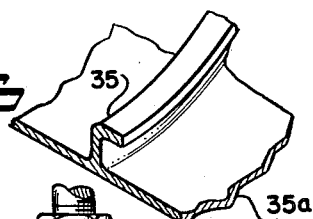
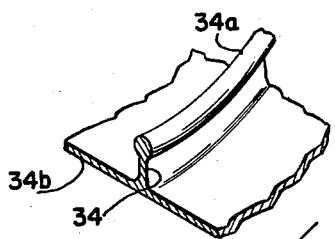
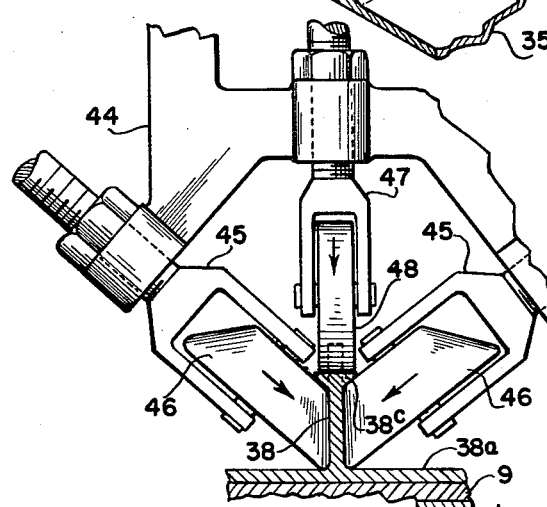
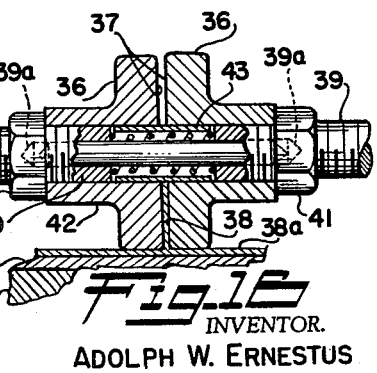
INVENTOR.
ADOLPH W. ERNESTUS
BY
George Sullivan
Agent Dec. 8, 1964  A. W. ERNESTUS  3,160,036
ROLL-FORMING MILL
Filed Aug. 29, 1958  5 Sheets-Sheet 5
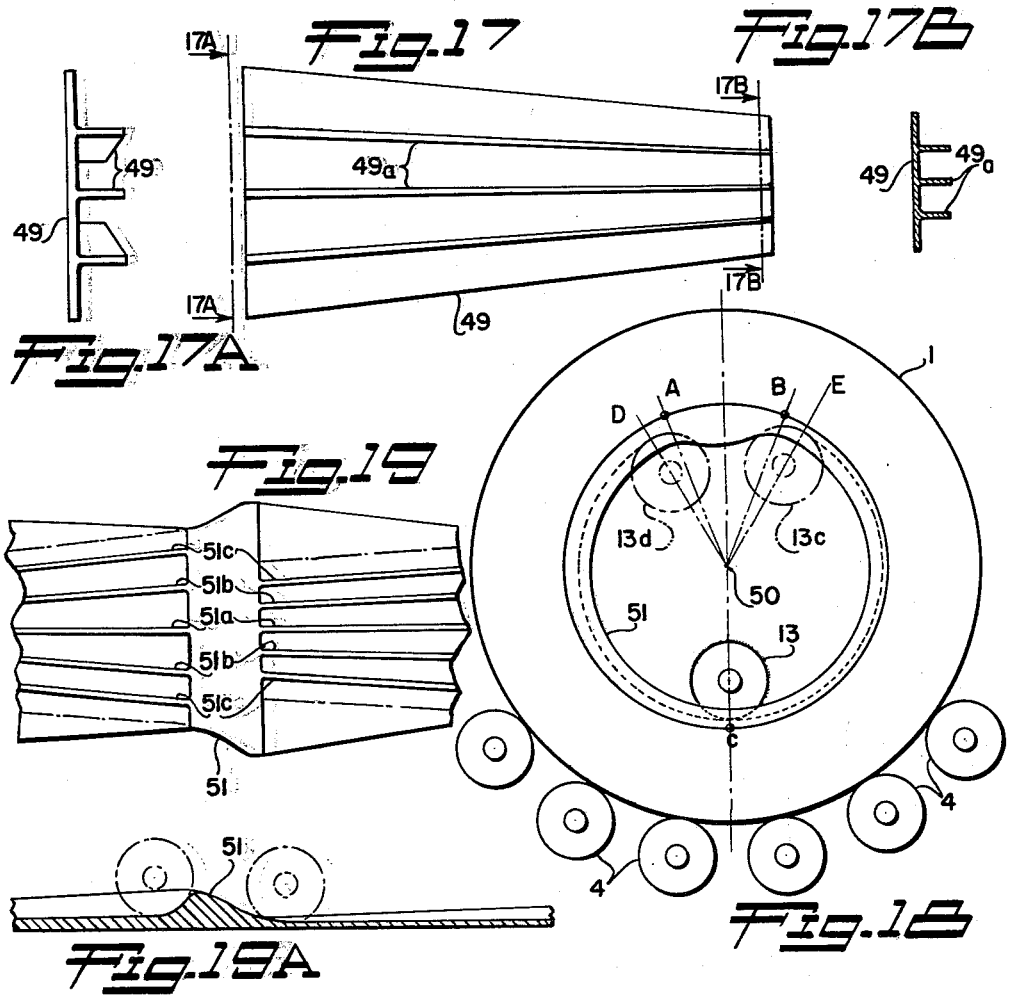
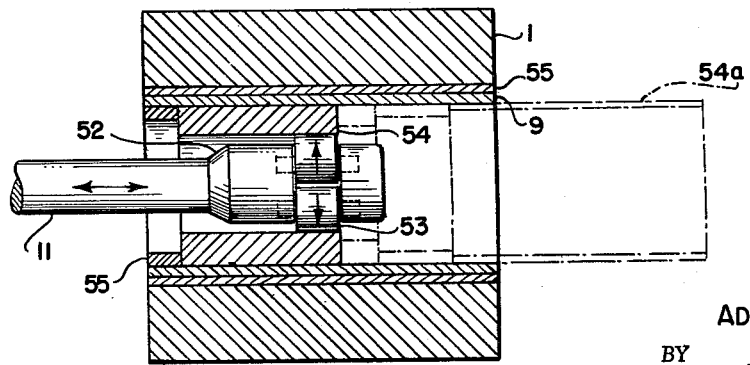
INVENTOR.
ADOLPH W. ERNESTUS
BY
George C. Sullivan
Agent 3,160,036
ROLL-FORMING MILL
Adolph W. Ernestus, Encino, Calif., assignor to Lockheed
Aircraft Corporation, Burbank, Calif.
Filed Aug. 29, 1958, Ser. No. 758,022
7 Claims. (Cl. 80—11)

This invention relates to metal forming devices, and more particularly to apparatus for metal forming of members incorporating integral ribs or support structures by rolling and/or roll forming operations.

There are many existing requirements for metallic structural members of thin cross-section that are capable of carrying large structural loads, such as straight or tapered panels, straight or contoured shells, tubes or cylindrical members, and torpedo flasks. Some of the most important present requirements are for use in rockets, aircraft, guided missiles and armaments, and the accomplish fulfillment of the strength and rigidity requirements such parts must have integral ribbing combined with thin-walled sections; the thin-walls serving to maintain the overall shape with as light-weight a structure as possible, while the integral ribbing associated therewith strengthens and rigidifies the thin-walls. Methods of accomplishment of manufacture of such members are known in the prior art, one of which is machining of integral ribbed structures from substantially solid pieces of metallic materails of sufficient dimensions to include both the thin-wall and integral ribbing. This method is undesirable to a certain extent in that such machining produces an extremely large percentage of scrap material by removal of the material between adjacent ribs, as well as being highly delicate and intricate so as not to cut through, gouge, or tear the thin-walls. Other methods such as chemical milling, extrusion or fabrication each have certain undesirable features such as, in the case of chemical milling, the time to form integral ribs of any substantial height, say 1/16 to 1/8 of an inch or more, the excessive amount of material to begin with, and the necessity of additional forming operations after forming of the integral ribbing. While integral ribbing with thin-walls can be formed by forming, there are certain inherent limitations as to sizes in both cylinders and panels, and in cylindrical or tubular members, the integral ribbing must extend longitudinally rather than annularly. Fabrication of such structural members or structures can comprehend a considerable gamut of operations such as riveting, welding, brazing, rolling, straightening, additional forming, etc. which in turn create additional manufacturing time and/or expense and require extensive facilities.

Accordingly, it is an object of this invention to provide an apparatus for roll-forming thin-walled integral ribbed structures.

Another object of this invention is to provide an apparatus for roll-forming and extruding thin-walled integral ribbed structures having a high strength to weight ratio.

It is another object of this invention to provide an apparatus for roll-forming thin-walled, integral ribbed structures without removal of material.

It is a further object of this invention to provide an apparatus for roll-forming unitary thin-walled, integral ribbed structures.

It is a still further object of this invention to provide an apparatus for roll-forming thin-walled, integral ribbed tubular structures having annular integral ribs.

It is still another object of this invention to provide an apparatus for roll-forming thin-walled, integral ribbed tubular structures having annular integral ribs of a desired cross-section of any variety of shapes.

A still further object of this invention is to provide an apparatus for roll-forming thin-walled, integral ribbed straight or contoured shell structures having annular integral ribs.

It is a still further object of this invention to provide an apparatus for roll-forming thin-walled pipes tapered in a longitudinal direction.

Still another object of this invention is to provide an apparatus for roll-forming thin-walled, integral ribbed structures of varying wall thickness and/or rib height.

Other objects and advantages will become apparent from the following description taken in connection with the accompanying drawings in which:

FIGURE 3 is a view showing an embodiment of another means and method for locating the axial position of the forming roller along the mandrel or roller shaft of FIGURE 1;

FIGURES 7, 8 and 9 show the various steps of transformation of a thin-walled integral ribbed cylinder into an integral ribbed panel member;

FIGURE 10 shows the details of an apparatus head attachment for relieving stresses in the ribs of the structure depicted in FIGURES 7 through 9 as the structure is transformed from a cylinder to a panel;

FIGURE 11 depicts a contoured shell member having annular integral ribbing of varying height, formed thereon;

FIGURE 12 is a cross-section of a thin-walled, integral ribbed contoured shell, having integral ribbing of constant height formed thereon;

FIGURES 13, 14 and 15 show modifications and variations of the integral ribbing cross-sectional shapes;

FIGURE 16 shows the apparatus roller head details for increasing the height of the integral ribbing preparatory to modifying the cross-sectional shape of the integral ribbing;

FIGURE 16a shows the apparatus head details for forming one of the cross-sectional shape variations of the integral ribbing;

FIGURE 17 shows a flat tapered wing panel having integral ribbing;

FIGURE 17a is a view taken along line 17a—17a of FIGURE 17;

FIGURE 17b is a view taken along line 17b—17b of FIGURE 17;

FIGURES 18, 19 and 19a are explanatory to details of the method of forming the flat tapered wing panel of FIGURE 17 by means of the apparatus of the invention; and FIGURE 20 depicts the embodiment of this invention for extruding tapered thin-walled pipes or tubes.

Generally stated, one embodiment of the invention comprises a rotating die shaped to conform to the final outer size and shape of the desired tube, cylinder, or shell, and having a roller support shaft extending through the rotating die in an axial direction. A small ring blank is placed around the roller support shaft in the rotating die, whereupon radial movement of the support shaft exerts a radial pressure on the ring blank to cause enlargement of the outer diameter thereof until it substantially corresponds with the inner diameter of the die, some extrusion, i.e., metal flow, of the ring blank occurring in one direction only while being prevented from travel in the other direction by a gate attached to the rotating die.

When the ring blank is expanded to fit the die, a second roller is utilized for the initial formation of integral rib sections on the blank, after which still another roll is incorporated for exerting pressure on the inner surfaces of the ring blank between the initial rib locations. Since the ring blank is prevented from movement in only one direction, such pressure between the initial rib locations will decrease the wall thickness of the ring blank by the elongation of the ring blank in an axial direction due to the extrusion effect accomplished by the pressure roll. Once the overall shape and dimensions of the wall and integral ribbing are established, a variety of modifications to the cross-sectional shape of the integral ribbing can be accomplished.

Other embodiments of this invention, as disclosed hereinafter, include various apparatus heads for producing such structural variances as contoured shells or cylinders, straight tubular or cylindrical structures or members, and all including integral ribbing therewith to present thin-walled, integral ribbed structures or members having substantially high strength to weight ratios for the relative wall thickness dimensions involved.

A still further embodiment of the invention is disclosed hereinafter for producing thin-walled, tapered tubes or pipes by substantially the same apparatus as explained above with the exception of omitting the initial integral ribbing.

Figure 1:
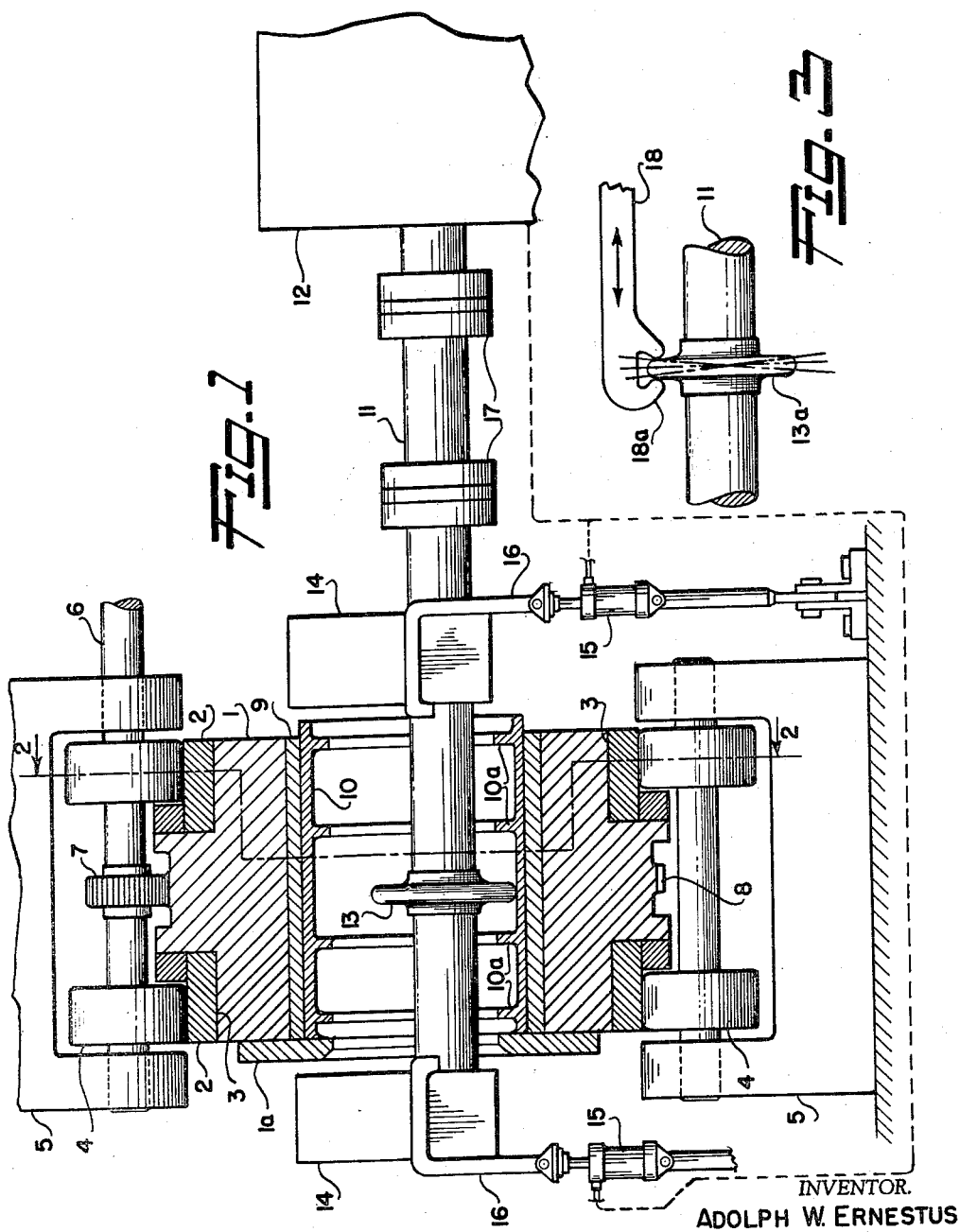
FIGURE 1 is a partial cross-sectional elevation view showing the apparatus of one embodiment of this invention incorporating a forming roller in operational position for roll-forming a thin-walled tubular member with integral ribbing of high strength to weight ratio.
Figure 2:
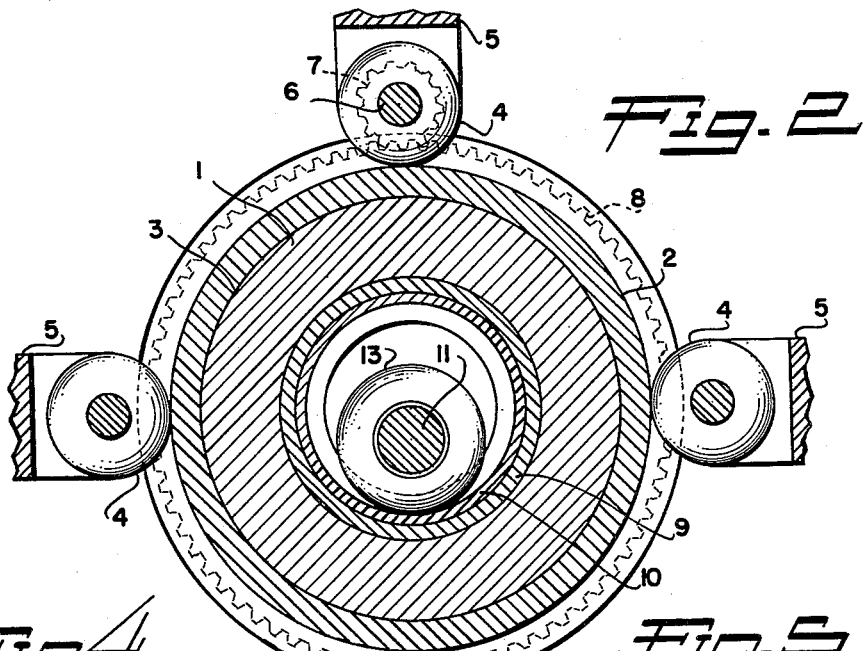
FIGURE 2 is a view taken along line 2—2 of FIGURE 1.

Referring more particularly to the drawings, in FIGURES 1 and 2, a rotating die ring 1 having hardened roller rings 2 secured thereto in circumferential relation around an annular recess 3, is supportedly mounted on a plurality of spaced rollers 4, which in turn are mounted in any suitable frame structure 5. Rotation of the rotating die or die ring 1 is accomplished by a shaft 6, connected to any appropriate rotating power source, having a pinion gear 7 in driving engagement with ring gear teeth 8 located around the outermost circumferential portion of rotating die ring 1.

Located within die ring 1 is a die insert 9, which is contoured or shaped to the overall outer surface shape of a workpiece or formed member 10. Extending through the die ring 1 and die insert 9 is a mandrel or roller support shaft 11 rotatably driven by a control and drive mechanism 12. Mounted on shaft 11 is a roller 13, which is located between two adjustable bearing support members 14 which serve to exert a radial pressure on support shaft 11 and in turn roller 13. Control of radial pressure exerted on roller 13 through bearing supports 14 is accomplished by actuators 15 included in clamping means 16, actuators 15 being shown schematically connected to control and drive mechanism 12. It is to be understood that there are other means of accomplishing the exertion of radial pressure on roller 13 such as hand control through wing nut and thread devices, weights, or a leverage system incorporated in clamping means 16, as well as the control of actuators 15 can be accomplished by any appropriate means other than control or drive mechanism 12.

To compensate for the relative movement between roller 13 and control and drive mechanism 12, I include a pair of flexible coupling members 17 in the roller support shaft 11.

Roller 13 is controllable in both axial and radial directions, the axial movement of roller 13 is accomplished by the axial movement of support shaft 11 by the control and drive mechanism 12, while the radial movement is controlled by actuators 15 and clamping means 16. Such adjustments of roller 13 relative to the rotating die ring 1 accomplishes rolling workability of the workpiece 10, as will be more apparent hereinafter.

Referring to FIGURE 3, there is shown a modification of the axial control means of roller 13 which comprises a roller 13a having a slightly larger inner diameter than roller 13 so as to have a close, slidable fit over roller support 11. A control rod 18, having a bifurcated end 18a fitting over the periphery of roller 13a, is movable bi-directionally parallel to the axis of support 11 by control and drive mechanism 12. Movement of control rod 18 in one direction will cause the roller 13a to skew slightly on support 11 and as it is rotatively driven, roller 13a will move axially along support 11 when radial pressure is exerted on roller 13a. In this modification, support 11 has no movement axially while control rod 18 is moved, whereas in the embodiment shown in FIGURE 1, roller 13 is securedly affixed to support 11 and axial movement of support 11 can be made with likewise concurrent movement of roller 13 therewith.

Figures 4, 5:
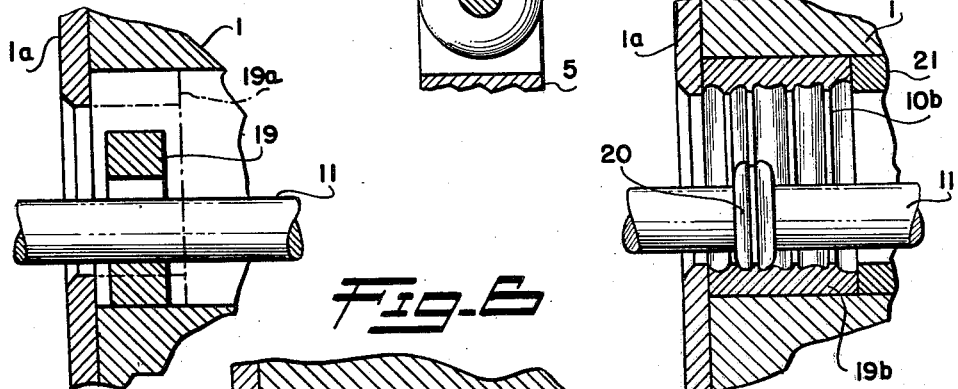
FIGURE 4 is a partial breakaway, cross-sectional view depicting the relationships between the shaft and the rotating die prior to expanding the material ring blank into a semi-formed structure shown in broken lines.
FIGURE 5 is a partial breakaway, cross-sectional view showing the material blank of FIGURE 4 radially expanded to fit the rotating die with partial formation longitudinally and the roller apparatus for initially forming the integral ribbing therein.
Figure 6:
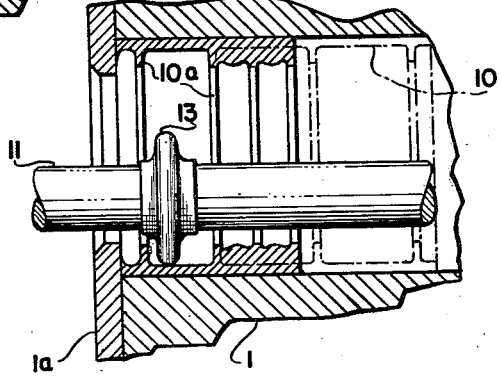
FIGURE 6 is a partial breakaway, cross-sectional view showing the apparatus and method of using for forming the thin-walled tubular portion extending between two adjacent annular integral ribs.

Referring now to FIGURES 4, 5 and 6, there is illustrated the steps and accomplishments necessary to form a tubular or cylindrical workpiece or formed member 10 having integral annular ribbing 10a. In FIGURE 4 an annular material blank 19 is mounted around support 11, which upon being moved radially causes the material blank 19 to be expanded to the size as indicated by phantom lines 19a by the pressure on the material blank exerted between roller support 11 and rotating die ring 1, it being noted that a further modification is here depicted in that the die insert 9 of FIGURE 1 can be dispensed with provided the rotating die ring 1 is of sufficient hardness. During the expanding operation, the original sized material blank 19 can expand axially in both directions until expansion in one axial direction is prevented by die ring 1a, after which further axial expansion must be made in the opposite direction only. Additional rolling with roller 20 mounted on roller support 11 imparts the initial formation of radially extending annular ribbing 10b as shown in FIGURE 5, which upon further working of the material blank culminates in integral ribbing 10a. To prevent the material blank from forming in an axial direction during the initial rib forming operation due to the pressure of roller 20, a second gate 21 is mounted at the end of the material blank opposite gate 1a. After the material blank assumes a shape indicated by 19b in FIGURE 5, the workpiece is formed axially by pressure from roller 13 on support 11 working or thinning the metal between adjacent integral ribs 10a, at one end of the workpiece. Upon completion of the extrusion between two adjacent integral ribs, the roller is axially moved to a position between the next adjacent pair of ribs 10b whereupon that portion of the workpiece is formed by the rolling pressure of roller 13. This operation is continued until the workpiece assumes a final shape as indicated by the numeral 10. As can be seen, by virtue of gate 1a the extrusion of workpiece 10 can only occur in one direction, with the amount of formation controlled by the working pressure exerted by roller 13 on workpiece 10 and the number of passes made over any one section of workpiece 10. It is of course to be understood that the forming operations can be started between any pair of adjacent integral ribs 10a and that the extruding of the sections between adjacent pairs of ribbing can be performed in any sequence. It is to be noted that by the proper location of ribs 10b by roller 20, the final or finished axial distance between adjacent integral ribs 10a can be dimensionally controlled.

Straight panel sections having integral ribbing can be formed by slitting the workpiece 10 longitudinally, as indicated by 22 in FIGURE 7 forming a slit cylindrical member 23 having integral ribbing. Curved structural members having integral ribbing can be formed by a partial straightening of member 23 in FIGURE 7 to form member 23a in FIGURE 8, or completely flat panel members can be formed by complete flattening, as indicated by member 23b of FIGURE 9.

In order to accomplish partial or complete straightening of member 23 in FIGURE 7 into members 23a of FIGURE 8 or 23b of FIGURE 9, there must be some rolling of ribs 24 of member 23 along the radial heights thereof to relieve any stress concentrations therein due to the lengthening of the free end portions of the ribbing caused by the straightening operation. Relief of such stress concentrations is accomplished by the roll mechanism shown in FIGURE 10 in which there are a pair of rollers 25 rotationally mounted to support members 26 and 27. Each of the support members 26 and 27 have arcuate tops 26a and 27a respectively, which are both in turn slidably mounted in key-way slots in a frame member 28, the slots having an axis of rotation 29 located at the intersection of the center lines of integral rib 24 and the thin-wall of member 23, which is a point slightly below the lowermost corners 25a of rollers 25. The rollers 25 are moved toward or away from each other by actuators 30, one of which connects one end of support member 26 to frame 28 and the other of which connects one end of support member 27 to frame 28. By retraction of both actuators 30 concurrently, the supporting members 26 and 27 will rotate about a center defined by point 29 whereupon the uppermost corner 25b of rollers 25 will move towards each other through a larger arc length than will the corners 25a of rollers 25. This in turn results in a larger pressure on integral ribbing 24 adjacent corners 25b of roller 25 than the pressure forces on the integral ribbing 24 adjacent the area of roller corners 25a. This greater pressure force on the free end of integral ribbing 24 will permit greater elongation of that portion of the rib than the portion adjacent to the thin-wall 23 as it is being straightened by any of the means and methods known in the prior art and thereby relieve or reduce any stress concentrations in the rib due to the lengthening or stretching of the free ends of the integral ribbing 24 due to the flattening of the member 23 to form members 23a or 23b.

Referring to FIGURES 11 and 12, there are shown further modifications of structures that can be formed by the apparatus and methods discussed heretofore. In FIGURE 11 is shown a contoured shell 31 having integral ribbing 31a of variable radial height which is accomplished by variable radial pressure control of roller 13 of FIGURE 1. It is also to be understood that a variable radial thickness can be accomplished in the wall of shell 31, as well as in, or in lieu of the variable radial height of the integral annular ribbing 31a. FIGURE 12 shows a contoured shell 32, similar to the overall shape of shell 31 in FIGURE 11, and having integral ribbing 32a of constant radial height.

FIGURES 13, 14 and 15 depict various modifications to the integral ribbing cross-sectional shape: FIGURE 13 showing a T-shaped cross-sectional annular ribbing 33 integral with a thin outer wall 33a. FIGURE 14 comprises an annular ribbing structure 34 having a rounded bead 34a at the free end thereof, such structure being integral with a thin-wall 34b. FIGURE 15, being similar to FIGURE 13, shows an L-shaped cross-sectional annular ribbing structure 35 integral with a thin-wall structure 35a.

In order to accomplish the working of the annular integral ribbing into one of the modified cross-sectional shapes, as described above, the radial height of the integral ribbing must be increased prior to the transforming or changing the free end of the integral ribbing into the desired cross-sectional shape. The apparatus for accomplishing such is shown in FIGURE 16 and comprises a pair of rollers 36 having confronting faces 37 of a substantially large radius so as to present slight curvatures thereto for ease of working annular ribbing 38 that is integral with thin-walls 38a. Each of the rollers 36 is mounted on a separate shaft 39, both of which are aligned together by a pin 40 extending into axial recesses 39a on the end of each shaft 39, and the rollers 36 are locked on their respective shafts 39 by nuts 41. Thickness of integral ribbing 38 is controlled by the axial relative displacements of rollers 36 by the relative axial displacement of threaded shafts 39. The roller faces 37 are biased away from each other by a compression spring 32, while the minimum spacing between the confronting faces 37 of rollers 36 is limited or controlled by a tubular spacer 43.

Once the radial height of integral ribbing 38 is established, the cross-sectional shape of the integral ribbing can be modified by utilization of a still further roller head modification on support 11 such as depicted in FIGURE 16a, which, in this instance, puts an axial flange 38c on integral ribbing 38. This head comprises a frame 44 to which are attached adjustable roller support yokes 45 for securing rollers 46 to the frame 44. A third adjustable roller support yoke 47 mounts the flange roller 48 to the frame 44. As the integral ribbing 38 is rotated, the rollers 46 maintain the radial depth and concentricity of the side walls of integral ribbing 38, while flange roller 48 produces a radial pressure on the top of integral ribbing 38 to form flange 38c.

FIGURES 17, 17a and 17b depict a tapered panel having tapered integral ribbing which is formed by a rolling operation, as described in more detail hereinafter, and straightened as described above. The panel comprises a thin-wall member 49 of tapered thickness having tapered integral ribbing members 49a which taper in thickness, height and relative distance from adjacent integral ribs.

FIGURE 18 shows the method of rolling the material blank in the rotating die ring 1 by continuous combined radial and axial displacement control of roller 13. As the die ring 1 rotates in a clockwise direction in FIGURE 18 from radius line D to E, there is a continuous radial displacement of roller 13 away from the center or axis of rotation 50, thereby taperingly decreasing the radial thickness of the outer wall. From radius line E, the roller 13 is moved radially inward toward the axis of rotation 50 of die ring 1 until radius line B rotates around to a position parallel to, and coextensive with the diameter of roller 13. From radius line B to radius line A, roller 13 is swung radially inward and outward to achieve its least radial displacement from axis 50, the radial outward swing of roller 13 continuing from radius line A to radius line D, whereupon there is repeated the continuous gradual radial displacement outwardly of roller 13 to radius line E resulting in the tapered wall thickness of member 51. The relative radial displacements of roller 13 at radius lines D and E being indicated by phantomed rollers 13d and 13e respectively, and are shown rotated from the actual position of roller 13 for purposes of clarity. It is also to be understood that the rotating die ring 1 be rotated bidirectionally between radius lines D and E rather than rotate continuously in one direction through full 360° rotations. Thus, continuation of this cycle will roll the outer wall portion of the material blank adjacent both sides of the center integral rib 51a of structure 51, in FIGURE 19, which is a view showing the structure 51 slit longitudinally along point C and straightened out for purposes of clarity to show the relative taper relationships of integral ribs 51a, 51b and 51c. The next adjacent ribs 51b on each side of rib 51a are rolled on structure member 51 by variation of the radial displacement of roller 13 as well as an axial movement. By axial movement, it is meant that roller 13 is moved in an axial reciprocating motion so as to impart the proper taper relationship between the ribs 51b with center rib 51a. Once the spacing between ribs 51a and 51b are rolled, the next adjacent spaces between ribs 51b and 51c are rolled by likewise radial and axial reciprocating control movements of roller 13. After the workpiece 51 is completely rolled and the proper taper relationships between the rib height, thickness and relative locations to adjacent ribs are established and completed, the cylindrical work member 51 can be removed from rotating die ring 1 and longitudinally slit between the radius lines A-B of FIGURE 18, and the member flattened as explained heretofore with FIGURES 7 through 10 to form the flat tapered panel member 49 appearing in FIGURE 17.

A still further modification of this invention is shown in FIGURE 20 comprising a still further apparatus head embodiment 52 mounted on roller support 11, head 52 having a plurality of rollers 53 that are capable of radial adjustment. In this embodiment, material blank 54 is extruded in an axial direction into a tapered, thin-wall pipe or tube 54a as indicated by the phantom lines. Material blank 54 is prevented from axial movement in one direction by gate 55 and the radial force or pressures transmitted to material blank 54 by rollers 53 causes the material blank to roll in the other direction into the tapered tubing 54a, the increase of the radial forces or pressures on material blank 54 by rollers 53 occurring by the radial adjustments between the relative centers of rollers 53 by any appropriate means, many of which are known in the prior art and which forms no part of this invention.

There may be some times when this rolling operation, or any of those explained above, may require the material being worked to be heated prior to the rolling operation and to prevent excessive heat transfer to the rotating die ring, an insulation ring 55 of ceramic, glass, or any other appropriate material may be inserted between the rotating die ring 1 and the die insert 9, it being understood, however, that the rolling operations can be performed with or without such an insulating material.

Thus it can be seen with this invention I can accomplish manufacture of unitary cylindrical structures having annular integral ribbing or any of a variety of modifications thereof, such as, tapered or contoured shells, integral ribbing of varying height, straight or tapered panels, or flasks or cylinders having a tapered wall thickness.

While particular embodiments of this invention have been illustrated and described, it will be obvious to those skilled in the art that various changes and modifications may be made without departing from the invention and it is intended to cover in the appended claims all such modifications and equivalents that fall within the true spirit and scope of this invention.

What is claimed is:

1. A metal forming apparatus comprising a rotatably mounted annular die ring, a shaft extending axially through the opening of said die ring having integrant roller means thereon, motive power means for rotatively driving the die ring and said shaft with integrant roller means, and control means for varying and controlling the axial and radial position of the integrant roller means relative to the die ring thereby exerting radial pressure on the areas between initial integral ribbing formations on an annular workpiece radially expanded to fit the die ring and such that continuation of radial pressure thereafter forms the workpiece in an axial direction forming a thin-walled structural member with integral ribbing of high-strength-to-weight ratio, said control means including an actuator coupled to said shaft to selectively exert the radial pressure on the workpiece.

2. A metal forming apparatus comprising a rotatably mounted annular die ring, a shaft extending axially through the opening of said die ring having integrant roller means thereon, motive power means for rotatably driving the die ring and said shaft with integrant roller means, control means for varying and controlling the axial and radial position of the integrant roller means relative to the die ring thereby exerting radial pressure on the areas between initial integral ribbing formations on an annular workpiece radially expanded to fit the die ring and such that continuation of radial pressure thereafter extrudes the workpiece in an axial direction forming a thin-walled structural member with integral ribbing of high-strength-to-weight ratio, abutment means adjacent one end of the die ring for limiting the workpiece elongation to one axial direction only and said control means including an actuator coupled to said roller means via said shaft to selectively exert the radial pressure on the workpiece.

3. A metal forming apparatus comprising a rotatably mounted annular die ring, a shaft extending axially through the opening of said die ring, roller means mounted on said shaft and axially slidable thereon, motive power means for rotatively driving the die ring and shaft, a first control means for varying the radial position of the shaft and roller means mounted thereon, and a second control means for varying the axial location of the roller means on the shaft by skewing the roller means relative to the shaft whereby the roller means is bidirectionally movable axially therealong as the shaft rotates, said first control means by varying the radial position of the shaft effecting a radial pressure by the roller means on an annular workpiece radially expanded to fit the die ring whereby continuation of radial pressure thereafter extrudes the workpiece in a axial direction having an outer surface conforming to the shape of the die ring.

4. A metal forming apparatus comprising a rotatably mounted annular die ring, an annular hardened die insert fitting the interior of said die ring, a roller support extending axially through the opening of said die insert, a roller mounted on said roller support for rotation with respect thereto, motive power means for rotatively driving the die ring-insert assembly and said roller support in metal working relation with respect to said roller and roller support, and control means for varying and controlling the axial and radial position of the roller support thereby exerting radial pressure on an annular workpiece and radially expanding the workpiece to conform to the shape of the die insert and such that continuation of radial pressure thereafter elongates the workpiece in an axial direction, said control means including an actuator coupled to said roller support to selectively exert the radial pressure on the workpiece.

5. A metal forming apparatus comprising a rotatively mounted annular die ring, an annular ring of hardened insulation material fitting the interior of said die ring, roller means extending axially through the opening of said insulation ring, motive power means for rotatively driving the die ring-insulation assembly and said rolling, and control means varying and controlling the axial and radial position of the roller means thereby exerting radial pressure on a heated annular workpiece radially expanded to fit the insulation ring whereby continuation of radial pressure thereafter extrudes the workpiece in an axial direction having an outer surface conforming to the shape of the insulation ring, the insulation ring serving to reduce the ratio of heat transfer from the heated workpiece to the die ring.

6. A metal forming apparatus comprising a rotatably mounted annular die ring, an annular ring of hardened insulating material fitting the interior of said die ring, an annular hardened die insert fitting the interior of said insulation ring, a roller means extending axially through the opening of said die insert, motive power means for rotatively driving the die ring-insulating ring-die insert assembly and said roller means, and control means varying and controlling the axial and radial position of the roller means thereby exerting radial pressure on a heated annular workpiece radially expanded to fit the die insert whereby continuation of radial pressure thereafter extrudes the workpiece in an axial direction having an outer surface conforming to the shape of the die insert, the insulation ring limiting the rate of heat transfer from the heated workpiece and die insert to the die ring.

7. A metal forming apparatus comprising a rotatably mounted annular die ring, a shaft extending axially through the opening of said die ring having integrant roller means thereon, motive power means for rotatively driving the die ring and said shaft with integrant roller means, and control means varying and controlling the axial and radial position of the integrant roller means relative to the die ring thereby exerting radial pressure on an annular workpiece radially expanded to fit the die ring whereby continuation of radial pressure thereafter forms initial ribbing formations on the workpiece preparatory to forming a thin-walled structural member with integral ribbing of high-strength-to-weight ratio and said control means including an actuator coupled to said roller means via said shaft to selectively exert the radial pressure on the workpiece.

References Cited in the file of this patent

UNITED STATES PATENTS

| | | |
|---|---|---|
| 319,753 | Simonds | June 9, 1885 |
| 324,117 | Kellogg | Aug. 11, 1885 |
| 1,083,598 | Douglas | Jan. 6, 1914 |
| 1,377,177 | Anderson | May 10, 1921 |
| 1,523,951 | Fulton | Jan. 20, 1925 |
| 1,528,832 | Kellogg | Mar. 10, 1925 |
| 1,700,751 | Vincent | Feb. 5, 1929 |
| 1,717,720 | Martin et al. | June 18, 1929 |
| 1,798,742 | Kellogg | Mar. 31, 1931 |
| 1,926,628 | Morehouse | Sept. 12, 1933 |
| 2,167,424 | Novack | July 25, 1939 |
| 2,307,191 | Bell et al. | Jan. 5, 1943 |
| 2,557,722 | Brauchler | June 19, 1951 |
| 2,639,757 | Cheek | May 26, 1953 |
| 2,776,585 | Kendall | Jan. 8, 1957 |

FOREIGN PATENTS

| | | |
|---|---|---|
| 111,528 | Australia | Sept. 26, 1940 |
| 915,322 | Germany | July 19, 1954 |